US00RE34951E

United States Patent [19]

Slosberg et al.

[11] E Patent Number: Re. 34,951

[45] Reissued Date of Patent: May 23, 1995

[54] FLAME RETARDANT TUFTED CARPET TILE AND METHOD OF PREPARING SAME

[75] Inventors: David K. Slosberg, Atlanta; Gilbert S. Nowell, Marietta, both of Ga.

[73] Assignee: Interface, Inc., La Grange, Ga.

[21] Appl. No.: 983,778

[22] Filed: Dec. 1, 1992

Related U.S. Patent Documents

Reissue of:

[64] Patent No.: 4,689,256
Issued: Aug. 25, 1987
Appl. No.: 902,318
Filed: Aug. 29, 1986

[51] Int. Cl.[6] ..... B32B 33/00

[52] U.S. Cl. ..... 428/95; 428/96; 428/97; 427/355; 427/359; 427/389.9; 427/394; 427/412

[58] Field of Search ..... 428/95, 96, 97; 427/355, 359, 389, 9, 394, 412

[56] References Cited

U.S. PATENT DOCUMENTS

| | | | |
|---|---|---|---|
| 3,262,894 | 7/1966 | Green . | |
| 3,332,828 | 7/1967 | Faria et al. . | |
| 3,616,138 | 8/1969 | Wentworth . | |
| 3,661,691 | 5/1972 | Slosberg | 428/95 |
| 3,663,345 | 5/1972 | Jaisinghani . | |
| 3,676,280 | 7/1972 | Sands . | |
| 3,679,469 | 7/1972 | Moore . | |
| 3,827,907 | 8/1974 | LaBlanc . | |

(List continued on next page.)

FOREIGN PATENT DOCUMENTS

| | | |
|---|---|---|
| 183922 | 7/1922 | United Kingdom . |
| 1451335 | 9/1976 | WIPO . |

OTHER PUBLICATIONS

Abu-Isa, I A., "Degradation of Chlorinated Polyethylene. I. Effect of Antimony Oxide on the Rate of Dehydrochlorination," *Journal of Polymer Science: Part A-1, vol. 10, pp. 881-894 (1972).*

Anita, et al., "The Combined Action of Aluminum Oxides and Halogen Compounds as Flame Retardants," *European Polymer Journal,* vol. 17, pp. 451-455 (1981).

Anita, et al., "Binary Mixtures of Metal Compounds as Flame Retardants for Organic Polymers," *European Polymer Journal,* vol. 18, pp. 95-107 (1982).

Anita, et al., "Comprehensive Study of the Effect of Composition on the Flame-Retardant Activity of Antimony Oxide and Halogenated Hydrocarbons in Thermoplastic Polymers," *European Polymer Journal,* vol. 18, pp. 167-174 (1982).

Bonsignore, et al., "Alumina Trihydrate as a Flame Retardant and Smoke Suppressive Filler in Rigid High Density Polyurethane Foams, " *The Journal of Fire & Flammability,* vol. 8, p. 95 (Jan 1977).

Brauman, S. K., "Smoke Generation from the Burning of Some Polymeric Materials," *Journal of Fire Retardant Chemistry,* vol. 6, pp. 41-58 (Jan. 1976).

(List continued on next page.)

*Primary Examiner*—George F. Lesmes
*Assistant Examiner*—Terrel Morris
*Attorney, Agent, or Firm*—Kilpatrick & Cody

[57] ABSTRACT

A flame-resistant carpet tile having low smoke values and improved flame resistance which carpet tile comprises a primary backing having a fibrous face and a fibrous back, a barrier layer adjacent to fibrous back to an acrylic polymer heavily loaded with a metallic flame-retardant salt filler material which acrylic polymer is compatible with a vinyl chloride polymer layer and a relatively thick vinyl chloride polymer backing layer adhering to the barrier layer.

The method of preparing a flame-resistant carpet tile which comprises pre-coating the back of a carpet with an acrylic polymer latex containing a metallic salt flame-retardant filler material, coating the latex material with a PVC layer, thereafter laying the latex PVC coated carpet into the top surface of a liquid PVC backing layer, heating the laid-in carpet to fuse the PVC layers, cooling the carpet and cutting the carpet into carpet tile.

33 Claims, 1 Drawing Sheet

U.S. PATENT DOCUMENTS 3,877,974 4/1975 Mischutin .
3,940,525 2/1976 Ballard .
3,955,032 5/1976 Mischutin .
3,982,051 9/1976 Taft .
3,985,926 10/1976 Schwartz .
4,012,546 3/1977 Schwartz .

(List continued on next page.)

OTHER PUBLICATIONS

Brauman, S. K., "$SB_2O_2$-Halogen Fire Retardance in Polymers. II.Antimony-Halogen Substrate Interactions," *Journal of Fire Retardant Chemistry,* vol. 3, pp. 117-137 (Aug. 1976).

Brauman, S. K., "$Sb_2O_2$-Halogen Fire Retardance in Polymers, IIIRetardant-Polymer Substrate Interactions," *Journal of Fire Retardant Chemistry,* vol. 3, pp. 138-163 (Aug. 1976).

Brauman, S. K., "$Sb_2O_2$-Halogen Fire Retardance in Polymers, IV.Combustion Performance," *Journal of Fire Retardant Chemistry,* vol. 3, pp. 225-264 (Nov. 1976).

Brauman, S. K., "Friedel-Crafts Reagents as Charring Agents in Impact Polystyrene," *Journal of Polymer Science: Polymer Chemistry Edition,* vol. 17, 1129-1144 (1979).

Chamberlain, D. L., "Mechanisms of Fire Retardance in Polymers," *Flame Retardance of Polymeric Materials,* Marcel Dekker, Inc., New York, pp. 109-168 (1978).

Connolly, et al., "Aluminum Hydrate Filler in Polyester Systems," *Modern Plastics,* pp. 154, 156, 202 (Oct. 1965).

Cullis and Hirschler, *The Combustion of Organic Polymers,* Clarendon Press, Oxford (1981).

Cullis, C. F., "Metal Compounds as Flame Retardants for Organic Polymers," *Developments in Polymer Degradation-3,* pp. 283-314 Applied Science Publishers, London, England (1981).

Cullis and Hirschler, "The Significance of Thermoanalytical Measurements in the Assessment of Polymer Flammability," *Polymer,* vol. 24, pp. 834-840 (Jul. 1983).

Donaldson, et al., "Flame Retardance and Smoke Suppression by TIN(IV) Oxide Phases and Decabromobiphenyl," *European Polymer Journal,* vol. 19, pp. 33-41 (1983).

Einhorn, I. N., "Fire Retardance of Polymeric Materials," *Journal of Macromolecular Science, Revs, Polymer Techniology* D1(2), pp. 113-184 (1971).

*European Plastics News,* "Additives for Plastics-Flame Retardants," pp. 13-14, 20-24, ISS 00825-00826 (Apr. 1978).

Fenimore, et al., "Flammability of Polymers," *Combustion and Flame,* vol. 10, pp. 135-139 (Jun. 1966).

Fenimore, et al., "Modes of Inhibiting Polymer Flammability," *Combustion and Flame,* vol. 10, pp. 295-301 (Sep. 1966).

"Fire Fans Furor Over Flammable Fabric," *Chemical Week,* vol. 106, No. 24, pp. 141-148 (Jun. 17, 1970).

"Flame Retardants Pass the 100-Million-Lb. Mark," *Modern Plastics,* pp. 102-104, 196, 201-202 (Sep. 1966).

Ganteaume, et al., "Etude Cinetique D'Une Decomposition Thermique Par Couplage De La Calorimetrie Et De L'Analvse Thermique A Vitesse De Decomposition Constante," *Journal of Thermal Analysis,* vol. 3, pp. 413-420 (1971).

Hastie, J. W., "Mass Spectrometric Studies of Flame Inhibition: Analysis of Antomony Trihalides in Flames," *Combustion and Flame,* vol. 21, pp. 49-54 (Aug.-Dec. 1973).

Hastie, J. W., "Mass Spectrometric Analysis of 1 atm Flames: Apparatus and the $CH_4$-$O_2$ System," *Combustion and Flame,* vol. 21, pp. 187-194 (Aug.-Dec. 1973).

Hecker, K. C., "Fire-Retardant Foam Rubber," *Rubber World,* pp. 59-63 (Dec. 1968).

Hecker, et al., "Flammability and Smoke Properties, " *Rubber Age,* pp. 25-32 (Apr. 1973).

Hindersinn, et al., "Fire Retardancy," *Encyclopedia of Polymer Science and Technology,* vol. 7, pp. 1-64 (1964-1972).

Hindersinn, et al., "The Importance of Intumescence and Char in Polymer Fire Retardance," *Flame Retardance of Polymer Materials,* vol. 4, pp. 1-104 Marcel Dekker, Inc., New York (1978).

Hirschler, M. M., "Effect of Oxygen on the Thermal Decomposition of Poly(Vinylidene Fluoride)," *European Polymer Journal,* vol. 18, pp. 463-467 (1982).

Hirschler, M. M., "Thermal Analysis and Flammability of Polymers," *European Polymer Journal,* vol. 19, pp. 121-129 (1983).

Hirschler, M. M., "Flame Retardant Mechanisms: Recent Developments," *Developements in Polymer Stabili-*

(List continued on next page.)

U.S. PATENT DOCUMENTS 4,055,694 10/1977 Hadgraft .
4,097,630 6/1978 Schwartz .
4,239,563 12/1980 Iacoviello .
4,286,003 8/1981 Higgins .
4,435,459 3/1984 McKinney et al. ..... 428/95

(List continued on next page.)

OTHER PUBLICATIONS

*sation*–5, Applied Science Publishers, London, England and New Jersey, USA, Chapter 5, pp. 107–152 (1981).

Hopkins, R. C., Alumina Trihydrate–The Clean, Low Cost Flame Retardant, *Polymer Age*, vol. 6(56), No. 5, pp. 130–136 (May 1975).

Jackson, et al., "The Heat of Dehydration of Alumina Trihydrate," *Fire and Materials*, vol. 2, No. 1, pp. 37–38 (Jan 1978).

J. K., "Flame retardants," *Modern Plastics*, pp. 96–97 (1970).

Johnson, P. R., "A General Correlation of the Flammability of Natural and Synthetic Polymers," *Journal of Applied Polymer Science*, vol. 18, pp. 491–504 (1974).

Kittaka, et al., "Interaction of Water Molecules with the Surface of Tin(IV Oxide," *Journal of the Chemical Society*, vol. 1, pp. 676–685 (1978).

Lawson, et al., "Mechanism of Smoke Inhibition by Hydrated Fillers," *Rubber Chemistry and Technology*, vol. 48, No. 1, pp. 124–131 (Mar.–Apr. 1975).

Learmonth, et al., "Flammability of Plastics I. Relation Between Pyrolysis and Burning." *British Polymer Journal*, vol. 1, pp. 149–153 (1969).

Learmonth, et al., "Flammability of Plastics II, Effect of additives on the Flame." *British Polymer Journal*. vol. 1, pp. 154–160 (1969).

Learmonth, et al., "Flammability of Plastics III, Reactions Between Antimony Trioxide and Organic Halogenated Flame Retardants with Reference to their Performance in a Crosslinked Polyester Resin," *British Polymer Journal*, vol. 2, pp. 104–109 (1970).

Learmonth, et al., "Flammability of Plastics IV, An Apparatus for Investigating the Quenching Action of Metal Halides and Other Materials on Premixed Flames," *British Polymer Journal*, vol. 2, pp. 249≧253 (1970).

Learmonth, et al., "Flammability of Polymers V. Thermal Volatilisation Analysis of Polyester Resin Compositions," *British Polymer Journal*, vol. 4, pp. 317–325 (1972).

Lyons, John W., *The Chemistry and Uses of Fire Retardants*, Wiley–Interscience (May 1970).

Martin, et al., "Flammability of Epoxy Resins," *Journal of Applied Polymer Science*, vol. 12, No. 1, pp. 143–158 (Jan. 1968).

Miller et al., "An Evaluation of Some Factors Affecting the Smoke and Toxic Gas Emmission From Burning Unsaturated Polyester Resins," Proceedings of the Reinforced Plastics/Composites Institute 31st Annual Conference, Section 20–C, pp. 1–8 (Feb. 3–6. 1976).

Morishige, et al., "The Thermal Desorption of Surface Hydroyxls on Tin(IV) Oxide," *Bulletin of the Chemical Society of Japan*, vol. 53, No. 8, pp. 2128–2132 (1980).

Nelson, G. L., "Smoke Evolution: Thermoplastics," *J. Fire & Flammability*, vol. 5, pp. 125–135 (Apr. 1974).

Papa, A. J., "Flame–Retarding Polyurethanes," *Flame Retardancy of Polymeric Materials*, Marcel Dekker, Inc., New York, vol. 3, Chapter 1, pp. 1–133 (1975).

Pitts, J. J., "Antimony–Halogen Synergistic Reactions in Fire Retardants," *The Journal of Fire & Flammability*, pp. 51–84 (Jan. 1972).

Pitts, J. J. "Inorganic Flame Retardants and Their Mode of Action," *Flame Retardancy of Polymeric Materials*, vol. 1, Chapter 2, pp. 133–194, Marcel Dekker, Inc., New York (1973).

Rhys. et al., "Flame Retarding of Plastics Materials," *Chemistry and Industry*, No. 7, pp. 187–191 (Feb. 15, 1969).

Rouguerol, et al., "Thermal Decomposition of Gibbsite Under Low Pressures," *Journal of Catalysis*, vol. 36, pp. 99–110, (1975).

Scheffé, H., "Experiments with Mixtures," *Journal of the Royal Statistical Society*, vol. 20, No. 2, pp. 344–360 (1958).

Schuyten, et al., "Some Theoretical Aspects of the Flameproofing of Cellulose," *Flame Retardant Paints*, Advances in Chemistry Series, 9, pp. 7–20 (1953).

Smissaert, et al., "The Influence of Flame Retardants on the Smoke Emission of Polyamide Carpets," *Journal of Fire Sciences*, vol. 4, pp. 192–203 (May/Jun. 1986).

Throne, et al., "Heating Values and Thermochemical Properties of Plastics," *Modern Plastics*, pp. 96–100 (Nov. 1972).

Touval, I., "The Use of Stannic Oxide Hydrate as a Flame Retardant Synergist," *Journal of Fire & Flammability*, vol. 3, pp. 130–143 (Apr. 1972).

Walker, A. G., "Flame–Retardant Plastics," *British Plastics*, vol. 42, No. 7, pp. 128–132 (Jul. 1969).

Wall, Leo A., Editor, *The Mechanisms of Pyrolysis, Oxidation, and Burning of Organic Materials*, NBS Special (List continued on next page.)

U.S. PATENT DOCUMENTS

| | | | |
|---|---|---|---|
| 4,522,857 | 6/1985 | Higgins | 428/95 |
| 4,582,554 | 4/1986 | Bell et al. | 428/95 |
| 4,595,617 | 6/1986 | Bogdany | 428/95 |
| 4,661,380 | 4/1987 | Tillotson . | |
| 4,808,459 | 2/1989 | Smith . | |

OTHER PUBLICATIONS

Publication 357, U.S. Department of Commerce, National Bureau of Standards (Jun. 1972).

Woods, et al., "A New Heat-Stable Zinc Borate Fire Retardant," *Modern Plastics*, pp. 140–150 (Jun. 1970).

Woychesin, et al., "Effect of Particle Size on the Performance of Alumina Hydrate in Glass-Reinforced Polyesters," *The Journal of Fire and Flammability, Fire Retardant Chemistry Supplement*, vol. 2, pp. 224–241 (Nov. 1975).

Air Products, "Airflex RB-8 Emulsion Base for Carpet Backcoating," ISN 10259–10270 (1975).

*Architects' and Specifiers' Guide Series Contract Carpeting*, ISS 01289–01491 (1972/3).

BA Chemicals Ltd., "BACO FRF," Publication No. 110A, ISS 01159–01166 (Aug. 1977, Revised Nov. 1977).

Bayer, "Vulkasil Light-Coloured Reinforcing Fillers for the Rubber Industry, Zinc Oxide Activators, Apyral B Light-Coloured Fillers for Flame-Retardant Rubber Goods," ISN 08706–08709 (Oct. 1985).

Buckman Laboratories, Inc., "Busan® 11-M1 as a Partial Replacement for Antimony Trioxide in Fire-Retardant Plasticized PVC," Information Release MWH-750311, ISS 00375–00377 (1975).

Buckman Laboratories, Inc., "Busan® 11-M1 For Fire Resistance in Paints, Plastics, Textiles, Rubber, and Adhesives," Bulletin No. B2, ISS 00796–00808 (1973).

Dutral, "Dutral® Ethylene-Propylene Elastomers in the Building Industry," ISN 09289–09325 (Aug. 1984).

Imperial Chemical Industries Limited, "'Cereclor' in PVC Floor Covering," Technical Service Note No. TS/B/2267/1, ISS 01167–01185 (1973).

Imperial Chemical Industries Limited, "The Production of P.V.C.-Backed Carpets from 'CORVIC' Paste-Making Polymers," Information Service Note No. 832, ISS 00665–00686 (Dec. 6, 1961).

Revertex Ltd., "Tufted Carpet Primary Back-Coating and Pre-Coating for Foam," TEX.B34, ISN 08363–08373 (Aug. 1972).

Rhone-Poulenc-Polymeres, "Emulsion Rhodopas ®ST 448" Technical Data Sheet, ISN 10785–10786 (Jan. 1977).

Stokvis Chemicalien B.V., "Busan 11-M1; A Multifuncational Pigment for the Coatings Industry," Bulletin B1, ISN 10508–10515 (Sep. 19, 1983).

Vinamul Products Limited, "Polymer Emulsions for the Textile and Paper Industries" ISN 07614–07638 (1985).

Volkers, Firma L. J., "Steetley, Lycal HS: A Flame Retardant & Smoke Suppressant Filler," attachment to letter, ISN 10558–10563 (Jul. 14, 1986).

Benbow, et al., "Mechanisms of Synergism in Flame-Retardance, " International Symposium on Fire Safety of Combustible Materials, pp. 218–230 (Oct. 1975).

Bayer, "Latices Polymer Dispersions Latex Chemicals 2, Processing and Applications," Technical Information Bulletins No. 2.3.2, ISN 08447–08456 (Aug. 1981).

Belding, W. A., "Effective Low Cost Substitute for Hydrated Alumina in Flame Retarded Latex Systems," Flame Retardants, Proceedings of 1978 International Symposium on Flammability and Fire Retardants, pp. 15–29 (May 18–19, 1978).

Benisek, et al., "The Effect of Backing Fibre and Latex Type on the Burning Behaviour and Smoke Emission of Wool Carpets for Aircraft Interiors," International Wool Secretariat Technical Centre, Reprinted from *Journal of Fire & Flammability*, vol. 8, ISN 08011–08018 (Oct. 1977).

Byrne, et al., "Changing Perspectives for Latices in Carpet Applications," *Carpet & Rug Industry*, pp. 30–34, ISN 07608–07612 (Apr. 1977).

Dow Latex 893 and 852E, ISN 10750–10754 (Mar. 1983).

Dow Carpet Latexes chart, ISN 10757–10760 (1984).

Revertex Ltd., Textile Division, "Flame Retardant Carpet Backings," TEX.SP54, ISN 08083–08098 (Jul. 1977).

Soboley, et al., "Alumina Hydrate as a Flame-Retardant Filler for Thermoplastics," *The Journal of Fire and Flammability, Fire Retardant Chemistry Supplement*, vol. 1, pp. 13–25, (Feb. 1974).

FLAME RETARDANT TUFTED CARPET TILE AND METHOD OF PREPARING SAME

Matter enclosed in heavy brackets [ ] appears in the original patent but forms no part of this reissue specification; matter printed in italics indicates the additions made by reissue.

BACKGROUND OF THE INVENTION

Carpet tiles are typically composed of a fibrous or wear-type surface and an undersurface secured to a primary backing and containing a thick layer of a thermoplastic backing material, such as for example, of polyvinyl chloride resin as a solid or a foam, bitumen or atactic polypropylene. Often glass fiber scrim or tissue is employed with the primary backing and embedded in the backing layer in order to impart dimensional stability to the carpet tile. Typical carpet tiles and carpet tile production methods are described for example in U.S. Pat. No. 4,582,554 issued Apr. 15, 1986 hereby incorporated by reference.

It is desirable to provide for a carpet tile which has a low flame resistance and low smoke value. Flame-resistant carpets have been prepared by applying a carboxylated cross-linkable vinyl chloride resin composition to the back surface of a thermoplastic backing sheet which serves as the primary backing and then heating the vinyl chloride composition to cross-link the vinyl chloride resin and to bond the tufted yarns to the base of the primary backing. In such a method, the temperature of the cross-linking in heating is maintained below the shrinkable temperature of the polymeric fibrous primary backing is then laminated to the surface of the cross-linked vinyl chloride resin composition (see for example U.S. Pat. No. 3,661,691 issued May 9, 1972 hereby incorporated by reference).

The flame-retardant, vinyl-foam carpet and method of the patent provides for improved flame resistance by bonding the surface of the primary backing coated with a cross-linked vinyl resin to a secondary backing wherein the primary and secondary backing are prevented from shrinking and separating when exposed to open-flame conditions. This improvement is related to flame-retardant vinyl-foam backing carpet and not to carpet tile, which requires a very thick, heavy thermoplastic backing layer to secure a free-lay, dimensionally stable carpet tile.

SUMMARY OF THE INVENTION

The invention relates to a flame-resistant, low smoke value carpet tile and to the method of preparing the same. In particular, the invention concerns a flame-resistant carpet tile having low smoke values in which a pre-coat barrier layer is employed which is compatible with the backing layer and which barrier layer contains flame-retardant filler material.

It has been found that the application of a pre-coat latex barrier layer containing a flame-retardant filler material as a pre-coat for plastic-backed carpet tiles provides for a unique flame-resistant, low smoke value carpet tile. In particular, it has been discovered that the employment of a vinyl, particularly an acrylic-type pre-coating latex, which contains a metallic salt, and more particularly aluminum trihydrate, when employed as a pre-coat for a vinyl chloride resin carpet tile backing layer, provides for an improved flame-resistant, low-smoke value carpet tile. Carpet tile, so prepared, will typically register 0.5 or more on flame retardance when tested in accordance with the Flooring Radiant Panel Test ASTM E-648. This ASTM test essentially measures the watt density which is required to ignite the carpet in that the higher the test number, the more flame-resistant the carpet. In addition, the carpet tile typically has a value of less than about 400, e.g. 200 or less, on the smoke density value test [NBS ASTM E-62] *ASTM E662*. A typical prior art polyvinyl chloride vinyl carpet tile without the pre-coat barrier layer has smoke values of 600 to 700 or more. Therefore, the improved carpet tile generally has a significant reduction in smoke value properties and has greater flame resistance than ordinary, commercially produced polyvinyl chloride carpet tile.

Synthetic fibrous material such as polyamides used for carpet faces, like nylon, by itself, reduces low smoke values. Vinyl halide resins, such as polyvinyl chloride resins used as carpet tile backing either as a solid or a foam backing layer, does reduce, by itself, low smoke values. However, when the vinyl halide resin is directly in contact with the nylon fiber, the burning of the vinyl halide resin on exposure to heat and open flame gives off hydrogen chloride which attacks the nylon and makes the nylon burn more readily with higher than normal smoke values, e.g. over 600 to 700.

It has been discovered that the use of a pre-coat barrier layer which provides for a separation of the nylon or other fibrous carpet material from the underlying vinyl chloride or other halogenated backing resin provides carpet tile with excellent flame retardance and low smoke values. The pre-coat barrier layer serves to lock in the fiber on the back of the primary carpet tile backing, such as the tufted back layer. The pre-coat barrier layer does serve to separate the fibrous back surface of the carpet tile from the halogenated resin backing layer. Further the pre-coat barrier layer contains one or more flame-retardant agents, such as metal salts, and particularly metal salt hydrates, which generate water on heating, like aluminum trihydrate, to act as a flame retardant and also to reduce smoke values.

The carpet tiles of the invention having a low smoke value and improved flame resistance comprise a primary backing, such as a woven or non-woven thermoplastic backing sheet, such as a woven polypropylene backing or a non-woven polyester, with a fibrous face or wear surface, such as a tufted face, and a fibrous back surface, such as a loop or tufted surface where the carpet tile is tufted, and a barrier layer formed from the latex pre-coat adjacent and bonded to the fibrous back, which barrier layer comprise a vinyl polymer loaded with a flame-retardant filler material, and more typically with a metallic salt material. Importantly, the barrier or pre-coat layer employed must substantially separate the vinyl chloride backing layer from the fibrous back surface and be compatible with and directly bond to the thermoplastic backing layer, such as the vinyl chloride polymer backing layer used in the carpet tile.

The carpet tile has a relatively thick thermoplastic backing layer, e.g. 50 to 350 mils, e.g. 60 to 100 mils from the back of the yarn layer to the back of the carpet tile, such as a vinyl chloride polymer layer, adhering to the compatible barrier layer, and which backing layer imparts stability and free-laying properties to the carpet tile. Where the backing layer is solid, the thickness generally ranges from 50 to 200 mils, and where a cushion foam layer, from 100 to 350 mils. The pre-coat also serves to lock the back fibers to the back of the primary backing. Actually, if desired, the carpet tile may incorporate within the backing layer and the primary backing one or more additional scrim or tissue materials such as a glass fiber or polyester or a combination glass fiber polyester scrim material. Generally, the scrim material may be employed adjacent to the primary backing or closely adjacent thereto. In addition glass fiber or tissue materials may be employed within the thermoplastic backing layer to impart dimensional stability and improved laying properties of the carpet tile.

The backing layer may comprise a solid thermoplastic layer wherein, for example, the backing layer is cast as a wet plastisol onto a release surface and subsequent heat forced to the pre-coated carpet, or may comprise a foam thermoplastic foam layer, such as a pre-formed vinyl chloride layer, which, for example, is laminated to the pre-coated carpet. In one method, the pre-formed foam layer is directly heat laminated to the pre-coated carpet with the aid of and by residual heat in the vinyl chloride pre-coat layer to direct bond a polyvinyl chloride (PVC) foam layer to the PVC pre-coat layer (see for example U.S. Pat. No. 3,560,284, issued Feb. 2, 1971, hereby incorporated by reference).

The barrier layer, formed from pre-coating the back fibrous surface of the primary backing, typically is formed of a vinyl polymer, acrylic-like polymer latex. However, it is important that the latex employed as the pre-coat, or to form the barrier layer, be compatible with and bonds to the thermoplastic backing layer, typically with the polyvinyl chloride backing layer. It has been found that styrene-treated butadiene rubber (SBR) and carboxylated styrene-treated butadiene rubber latex and natural rubber latices are not satisfactory as pre-coat barrier layers since they are not compatible with the PVC backing of carpet tiles. Since such polymers are not compatible with the polyvinyl chloride, they lead to poor bond and little or no adhesion. Furthermore, there is a tendency for these latices, on a long-term aging, to extract plasticizer from the thermoplastic backing layer so that on aging, you get further rapid deterioration of the vinyl halide thermoplastic backing layer.

The fibrous material and yarns employed in the carpet tile as face and back yarn with the primary backing may comprise synthetic, natural or a combination of synthetic and natural fiber, such as but not limited to: polyamides like nylon; olefins like polypropylene; wool and wool blends; acrylic; acrylic-nylon blends and polyester yarns and combinations and blends thereof.

The flame-resistant carpet tile may be prepared by pre-coating, e.g. from about 15 to 50 ounces, such as 20 to 40, per square yard, the back of a primary backing containing a fibrous face and a fibrous back with an acrylic-type, pre-coated latex and heating the latex to drive off water to provide for a solid barrier layer. The latex composition employed is typically an aqueous acrylic latex containing a high selected amount of a flame-retardant filler material. Generally, and optionally, the barrier layer is then coated with a thin, liquid thermoplastic layer such as a vinyl chloride resin plastisol layer. A thermoplastic backing layer is generally formed on a releasable support such as a fluorocarbon, glass fiber endless belt or a stainless steel support sheet through casting, and optionally, a glass tissue is placed in the backing layer to provide for the dimensional stability. Thereafter, the pre-coated carpet is then laid into the liquid backing layer, the backing layer being liquid at the laying-in station, and then the carpet heated to fuse the vinyl resin, cooled and cut into carpet tile sections.

The flame-retardant carpet tile may also be prepared by other than the indirect coating technique predescribed, such as for example, by a direct coating onto the back of the carpet. In the direct coating method, the carpet is fed fibrous face down under a coating knife and the thermoplastic backing material, such as PVC plastisol backing is cast or coated in a layer of defined thickness directly onto the pre-coated carpet, and the cast PVC plastisol backing layer heated from above using radiant panels to fuse the solid backing layer.

In one embodiment, the first layer of a polyvinyl chloride plastisol is coated over to an endless belt support surface to a [define] *defined* thickness, and thereafter, a glass tissue or scrim sheet material is placed on top of and wetted by the liquid first layer, and the layer then heated to gel and to fix in place the glass tissue on or about the top surface of the first polyvinyl chloride PVC layer. Thereafter, a second layer is applied over the gelled first layer to imbed the glass fiber tissue or scrim to provide a backing layer for proper thickness, for example 50 to 250 mils. The back of the primary backing is then pre-coated with a flame-resistant latex pre-coat, e.g. 10 to 40 ounces per square yard, and heated to drive off the water and to form a barrier layer cross-linked or non-cross-linked. A PVC plastisol layer, e.g. 2 to 20 mils, is then coated onto the barrier layer. Thereafter, the latex PVC coated carpet is laid at a laying-in station into the top surface of the liquid second PVC plastisol layer on the support. Thereafter, the carpet is then heated to fuse all of the PVC layers and to form the thick backing layer, then cooled, and cut into carpet tile.

The polymer pre-coat latex composition generally comprises a vinyl such as an acrylic-type polymer which may be composed of copolymers containing acrylic acid or methacrylic acid and alkyl acrylates, such as ethyl acrylate, methyl acrylate and polymethylacrylate. Such acrylic latex compositions are well known and may include desired various amounts of cross-linking agents and other additives and materials such as stabilizers, plasticizers, dispersing agents, thickeners, surfactant, as well as various filler-type materials. The acrylic polymer also may comprise an acrylonitrile polymer, such as a butadiene-acrylonitrile copolymer, provided there is a high amount of the acrylonitrile present in the copolymer, that is typically more than 50% and generally more than 60% to 70% in order to provide compatibility with the thermoplastic backing layers.

The polymers used in the pre-coat composition generally should be non-halogenated polymers, or where halogenated polymers are used, high amounts of flame-retardant agents and filler must be employed. In one preferred embodiment, the pre-coat carpets would comprise vinyl polymers, such as, but not limited to: acrylic-styrene copolymer; acrylonitrile-styrene copolymer; vinyl, short-chain fatty acid copolymer like ethylene-vinyl vinyl acetate, polyvinyl acetate and vinyl acetate; acrylite polymer; and combinations thereof.

Halogenated polymer latices may be used in small amounts, but are not preferred, such as vinyl chloride latex and vinylidene chloride-acrylonitrile latex; however, high amounts of filler material should be used to reduce the effects of the halogenated content of the polymer. Non-halogenated latices permit lower amounts of filler material and provide a tougher, generally more adherent film and barrier layer which is better for tuft back and moisture resistance. Halogenated latices are not generally useful, except in small quantities with non-halogenated latices, where nylon is the fibrous material.

The pre-coat acrylic latex composition importantly employs a high amount of a flame-retardant additive in order to impart and serve as a flame-retardant barrier layer. Generally, the flame-resistant filler material employed comprises a metal salt, such as a muiti-valent metal salt composed of barium, zinc, .magnesium, aluminum and the like, such as the oxides, the carbonates, borates, sulfates and phosphates of such metals. In particular, it has been found that the employment of a zinc salt like zinc oxide or zinc borate, a magnesium-like magnesium oxide or magnesium carbonate, a barium salt such as barium sulfate, and more particularly, aluminum oxide or aluminum trihydrate alone or in combination with other non-halogenated agents are particularly useful in the pre-coat latex. The employment of aluminum trihydrate is particularly desirable since this compound gives off water at high ignition temperatures and therefore generates steam instead of smoke and tends to lower the smoke value of the carpet tile and limit noxious gases. The amount of flame-resistant filler material to be employed in the pre-coat composition may vary as desired, but typically ranges from about 50 to 350 parts, e.g. 100 to 250 parts per weight per 100 parts of the acrylic polymer.

Carpet tiles are different from the production of ordinary tufted or other fibrous-faced carpets because there is no requirement on a typical carpet for a heavy backing layer. In carpet tile, a rigid, stabilized mass of a thermoplastic backing layer is required in order to hold down the carpet tile, that is to call it a free-lay carpet tile. Generally, the backing layer has a high filler content and is employed or with various scrim materials such as of glass fibers, polyester or a combination, to impart dimensional stability. Generally, the thermoplastic backing layer is polyvinyl chloride layer. The primary backing may be comprised of any type of fibrous-type material, such as a thermoplastic material, like non-woven polypropylene or a polyester material. The loaded latex barrier layer, which is quite thin, then acts as a barrier sheet to shield the base from heat and improves the flame resistance and smoke values. Generally, the barrier layer has a thickness and is placed directly on and against the back surface of the loop or fiber containing primary backing and is applied in an amount to cover completely the loop backs and to lock in loops.

The invention will be described for the purposes of illustration only in connection with certain embodiments. However, it is recognized that various changes, modifications, improvements and additions may be made to describe the embodiments all falling within the spirit and scope of the invention.

DESCRIPTION OF THE EMBODIMENTS

Figure 1:
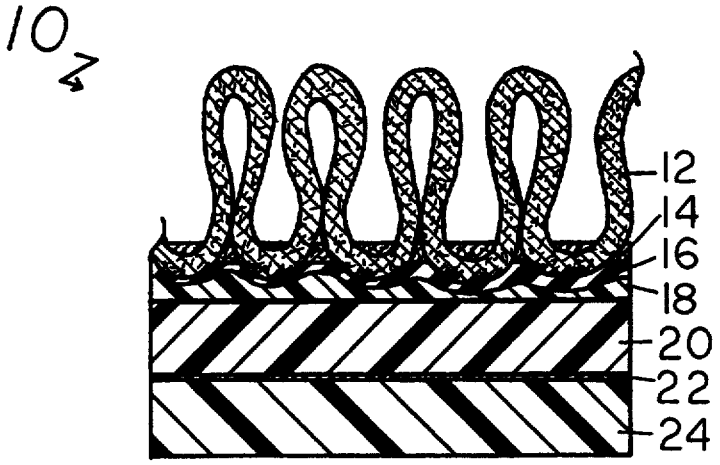
FIG. 1 is a schematic, illustrated, cross-sectional view of a flame [resistance] *resistant* carpet tile of the invention.

FIG. 1 shows a flame-resistant carpet tile 10 composed of a nylon-tufted fibrous face 12, a primary backing 14, such as a non-woven polypropylene sheet, a flame-resistant barrier layer 16, formed of a pre-coated acrylic latex containing aluminum trihydrate as a flame-retardant filler, the latex pre-coat, as illustrated, penetrates the back loops of the nylon fiber layer 12. The carpet tile 10 includes a thin pre-coat PVC layer 18 coated directly onto the acrylic pre-coat layer 16 and a solid polyvinyl chloride backing layer 20, a glass fiber scrim 22 secured between the PVC layer 20 and another PVC layer 24. The PVC layers 18, 20 and 24 are integrally bonded to each other in the illustrated method of preparing the carpet.

The PVC pre-coat layer 18 is not necessary and may be omitted. Further, the solid PVC backing layers 20 and 24 may be replaced with a single backing layer so that the back of the latex pre-coated carpet may be simply laid into the top surface of a wet, single PVC plastisol backing layer prior to heat fusion of the single backing layer.

The carpet as illustrated has a flame-retardant thin barrier layer which is compatible with the PVC precoat backing layer and which helps to lock in the back loops of the primary backing and separates the halogenated backing layer from the nylon backing layer of the carpet tile.

A vinyl latex pre-coat formulation suitable for use and compatible [iwth] *with* a PVC backing layer is as follows:

The carpet tile had a flame retardance on the radiant panel test of about 0.5 or more, e.g. 0.7 to 0.9, and a smoke value of about 300 or less, e.g. 225 to 275.

VINYL LATEX PRE-COAT FORMULATION

| Ingredients | Parts by Weight |
|---|---|
| 1. UNOCAL 76[1] a styrene-acrylic latex (latex) | 200 |
| 2. Water | 15 |
| 3. Aluminum trihydrate (ATH) (smoke and flame retardant | 150 |
| 4. CELLOID[2] 211 (dispersing agent for ATH) | 1 |
| 5. ACRYSOL[3] ASE 60 (polyacrylate salts as thickener) | 1.5 (as needed) |
| 6. Aqueous ammonia | To pH 8.5 |
| Brookfield viscosity 4/20 | 3 groups solids 68% |

Figure 2:
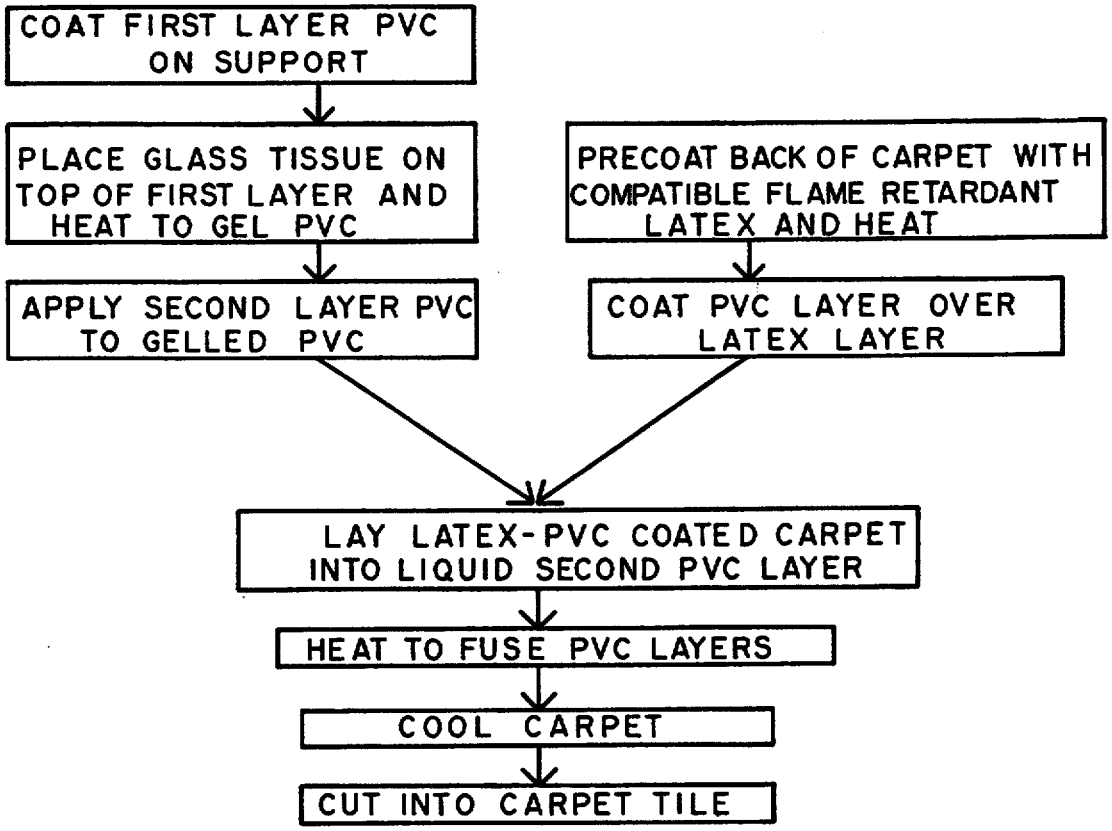
FIG. 2 is a block form diagram of a process for preparing the flame-resistant carpet tile of FIG. 1.

[1]a trademark of Union Oil Company
[2]a trademark of North Chemical Company, Inc. of Marietta, Georgia
[3]a trademark of Rohm & Haas Company FIG. 2 illustrates a block form diagram of a method of preparing a flame-resistant carpet tile as shown in FIG. 1. The method of the process is to cast or coat a layer of about 35 to 50 mils thick of a fibrous polyvinyl chloride (PVC) plastisol as the first coating on a flourocarbon-coated endless belt. This first PVC layer forms the back surface of the carpet and normally contains fillers therein, such as calcium carbonate or other particulate inert filler-type material, to provide weight thereto and lower cost. Glass fiber tissue sheet material is then laid onto the top surface of the first PVC plastisol layer, and this first layer is then heated in an oven, for example, from the bottom using heated platens beneath the endless belt, such as by circulating hot oil through the plates adjacent to the bottom of the endless belt, to gel the first layer and to fix the glass fiber tissue on or about the top surface. Then a second coat, a PVC plastisol coat, of about 25 to 50 mils, which may be the same of a different PVC plastisol, is applied over the first gel layer and the tissue sheet therein in order to bury the glass fiber tissue sheet intermediate the two PVC layers.

A carpet composed of a primary backing to which has been tufted a fibrous material to form a fibrous-face wear surface and a back loop or a back fibrous surface is pre-coated with [an the] *a* latex pre-coat formulation containing a high amount of aluminum trihydrate and heated to form a thin barrier layer. A PVC vinyl precoat that is a plastisol is then applied by a lick roller over the barrier layer. The carpet containing the barrier layer and the PVC pre-coat is then passed through a laying-in station and the back surface laid directly onto the top liquid plastisol of the second PVC backing layer. Typically, the laying-in station is very close to the second layer coating, the second layer PVC coating station. After the laying-in, the carpet is then sent though a fusing oven whereby the PVC layers are then fused to form an integral PVC backing layer. The carpet is then cooled and then cut into carpet tiles. The process thus involves a pre-coating station for pre-coating the latex then heating the latex at a station for pre-coating the latex layer with a pre-coat PVC layer and two stations for coating PVC to form the bulk of the backing layer.

The carpet tile so produced thus has a good bond between the vinyl-styrene barrier layer and the thermoplastic backing layer. The backing layer not only helps to lock in the fibers, but more importantly serves to improve the flame resistance and reduce the smoke values.

What is claimed is:

1. A carpet tile having improvide flame resistance, which carpet tile comprises:

(a) a primary backing having a fibrous face and a fibrous back;

(b) a barrier layer adjacent the fibrous back which barrier layer comprises a *non-halogenated latex* vinyl polymer and a [metal salt,] flame retardant filler material in an amount sufficient to provide a flame-retardant barrier layer, *which filler material comprises a compound selected from the group consisting of (i) a metal salt hydrate which generates water upon heating; and (ii) a metal salt of a borate, oxide, carbonate, phosphate, or sulfate of aluminum, barium, magnesiu, or zinc,* and which *latex* vinyl polymer is compatible with a [theromoplastic polymer] *vinyl chloride resin* backing layer; and (c) a [vinyl] *polyvinyl* chloride resin backing layer bonded to the barrier layer, to impart stability and free-laying properties to the carpet tile.

2. The carpet tile of claim 1 wherein the [metal salt] filler comprises aluminum trihydrate.

3. The carpet tile of claim 1 wherein the carpet tile includes a fiberglass or polyester tissue or scrim sheet material in the backing layer.

4. The carpet tile of claim 1 wherein the carpet tile is characterized by an ASTM [E-62] *E-662* smoke value of about 400 of less.

5. The carpet tile of claim 1 wherein the carpet tile is characterized by a flame-resistance ASTM E-648 value of about 0.5 or higher.

6. The carpet tile of claim 1 wherein the *latex* vinyl polymer comprises a butadiene-acrylonitrile polymer having an excess of about 50% or more by weight of acrylontrile.

7. The carpet tile of claim 1 wherein the barrier layer comprises from about 10 to 50 ounces per square yard, and the backing layer is a solid layer and has a thickness of from about 50 to 150 mils.

8. The carpet tile of claim 1 wherein the carpet tile is a tufted carpet tile.

9. The carpet tile of claim 1 wherein the backing layer is a vinyl chloride foam layer.

[10. The carpet tile of claim 1 wherein the backing layer comprises a polyvinyl chloride polymer layer. ]

11. The carpet tile of claim 1 wherein the barrier layer comprises from about 100 to 250 parts by weight of the flame-retardant filler material per 100 parts by weight of the vinyl polymer.

12. The carpet tile of claim 1 wherein the flame-retardant filler material comprises an oxide, sulfate, borate, phosphate or carbonate of zinc, barium, magnesium or aluminum.

13. The carpet tile of claim 1 wherein the fibrous face and fibrous back comprises a polyamide fiber.

14. The carpet tile of claim 1 wherein the *latex* vinyl polymer is selected from the group consisting of: copolymer of acrylic and methacrylic acid and alkyl acrylates; acrylic-styrene copolymers; acrylonitrile-styrene copolymers; ethylene-vinyl acetate copolymers; polyvinyl acetate; [and vinylidene chloride-acrylonitrile copolymers] and combinations thereof.

15. The carpet tile of claim 1 wherein the backing layer is a solid layer of from about 50 to 200 mils in thickness.

16. The carpet tile of claim 1 wherein the backing layer is a foam layer of from about 100 to 350 mils in thickness.

17. A carpet tile having low smoke values by ASTM [E-62] *E-662* of 300 of less and improved flame resistance by ASTM E-648 of 0.5 or more, which carpet tile comprises a primary backing, having a tufted fibrous face and a fibrous back fiber;

(a) a barrier layer adjacent to fibrous back which barrier layer comprises a *non-halogenated latex* vinyl-styrene copolymer containing from about 50 to 350 parts per 100 parts of the vinyl polymer of aluminum trihydrate and which barrier layer is compatible with a vinyl chloride resin backing layer; and (b) a solid [vinyl] *polyvinyl*chloride resin backing layer directly bonded to the barrier layer to impart stability and free-laying properties to the carpet tile.

18. The carpet tile of claim 15 [wherein] which includes a tissue or scrim-type sheet material imbedded in the vinyl chloride polymer backing layer.

19. The carpet tile of claim 17 wherein the fibrous face and back comprise a nylon fiber, and the *latex ep* vinyl polymer comprises a styrene-acrylic polymer.

20. In a method of preparing a flame-resistant carpet tile, which method comprises: applying a polyvinyl chloride resin backing layer to the back surface of a primary backing having a fibrous wear face surface and a fibrous back surface to form a carpet tile materials, the improvement which comprises:

(a) pre-coating the back surface of the primary backing with a thin precoat layer of a *non-halogenated* vinyl *polymer* latex composition; and heating the precoat layer to form a barrier layer, which vinyl polymer is compatible with the vinyl chloride resin backing layer and which pre-coat latex composition contains a flame-retardant amount of a metal sale, flame-resistant filler compound, *which compound is selected from the group consisting of (i) a metal salt hydrate which generates water upon heating; and (ii) a metal salt of a borate, oxide, carbonate, phosplhate, or sulfate of aluminum, varium, magnesium, or zinc.*

21. The method of claim 20 wherein the flame-resistant carpet tile comprises:

(a) the barrier layer comprising from about 100 to 250 parts by weight of a flame-retardant filler material per 100 parts by weight of the *latex* vinyl polymer;

(b) the flame-retardant filler material comprises an oxide, sulfate, borate, phosphate or carbonate of zinc, barium, magnesium or aluminum; and (c) a fibrous face and fibrous back comprise a polyamide fiber.

22. The carpet tile produced by the method of claim 20.

23. The method of claim 20 wherein the *latex* vinyl polymer is selected from the group consisting of: copolymer of acrylic and methacrylic acid and alkyl acrylates; acrylic-styrene copolymers; acrylonitrile-styrene copolymers[,] ; ethylene-vinyl acetate copolymers; polyvinyl acetate; [vinylidene chloride-acrylonitrile copolymers] and combinations thereof.

24. The method of claim 20 which includes pre-coating the vinyl latex composition onto the back surface in an amount of from about 15 to 50 ounces per square yard.

25. The method of preparing a flame-resistant carpet tile, which method comprises:

(a) coating a first layer of a polyvinyl chloride resin plastisol on a support surface;

(b) placing a dimensionally stable sheet material onto the top surface of the first layer and heating the layer to gel the layer and position the sheet material; p1 (c) applying a second layer of a polyvinyl chloride plastisol onto the gelled surface of the first layer;

(d) pre-coating the back of a primary backing having a fibrous wear-resistant face surface and a fibrous back surface, with a *non-halogenated* vinyl polymer latex composition, the latex composition containing a flame retardant amount of a metal salt filler [comound] *compound, which compound is selected from the group consisting of i) a metal salt hydrate which generates water upon heating; and (ii) a metal salt of a borate, oxide, carbonate, phosphate, or sulfate of aluminum, barium, magnesium, or zinc,* and wherein the vinyl latex polymer is compatible with the polyvinyl chloride, and heating the pre-coated layer to form a barrier layer;

(e) coating a thin, polyvinyl chloride liquid plastisol layer over the barrier layer;

(f) laying the coated barrier layer carpet onto the top surface of the plastisol of the second polyvinyl chloride layer;

(g) heating the carpet so formed to fuse the polyvinyl chloride layers into an integrally-fused backing layer;

(h) cooling the carpet; and (i) cutting the carpet into carpet tile.

26. The carpet tile produced by the method of claim

27. The method of claim 25 wherein the metal salt filler compound comprises aluminum trihydrate, the vinyl latex polymer comprises a styrene-acrylic latex polymer, and the fibrous face and back surface comprise a nylon fiber.

28. The carpet tile produced by the method of claim 27.

*29. The carpet tile of claim 1, wherein the non-halogenated latex vinyl polymer comprises ethylene vinyl acetate copolymer.*

*30. The carpet tile of claim 1, wherein the fibrous face comprises nylon, and the non-halogenated latex vinyl polymer comprises ethylene vinyl acetate copolymer.*

*31. The carpet tile of claim 1, wherein the fibrous face comprises nylon, the non-halogenated latex vinyl polymer comprises ethylene vinyl acetate copolymer, and the primary backing comprises polypropylene.*

*32. The carpet tile of claim 1, wherein the fibrous face comprises nylon, the non-halogenated latex vinyl polymer comprises ethylene vinyl acetate copolymer, and the metal salt comprises an aluminum salt.*

*33. The carpet tile of claim 1, wherein the fibrous face comprises nylon, the non-halogenated latex vinyl polymer comprises ethylene vinyl acetate copolymer, and the metal salt comprises a magnesium salt.*

* * * * *

UNITED STATES PATENT AND TRADEMARK OFFICE

CERTIFICATE OF CORRECTION

PATENT NO. : Re. 34,951
DATED : May 23, 1995
INVENTOR(S) : David K. Slosberg and Gilbert S. Nowell It is certified that error appears in the above-indentified patent and that said Letters Patent is hereby corrected as shown below:

In the Abstract, on line 4, delete "back to" and insert -- back of --.

In the section entitled, Other Publications, add -- L. Benisek and W.A. Phillips, `The Effect of the Low Smoke Zirpro Treatment and Wool Carpet Construction on Flame Resistance and Emission of Smoke and Toxic Gas,' Journal of Fire Sciences, Vol. 1, pp. 418-431, November/December 1983. --.

On Page 2, right-hand column, 11 lines up from the bottom, delete "1-104" and insert -- 1-107 --.

On Page 3, left-hand column, 8 lines up from the bottom, delete "249≥253" and insert -- 249-253 --.

Column 8:
In claim 19, line 56, delete "ep".

Column 9:
In claim 20, line 7, delete "varium" and insert "barium".

UNITED STATES PATENT AND TRADEMARK OFFICE

CERTIFICATE OF CORRECTION

PATENT NO. Re. 34,951

DATED May 23, 1995

INVENTOR(S) David K. Slosberg and Gilbert S. Nowell

It is certified that error appears in the above-indentified patent and that said Letters Patent is hereby corrected as shown below:

Column 9:
In claim 25, line 39, delete "p1".

Column 10:
In claim 25, line 2, before "i" insert -- ( --.

Column 10:
In claim 26, line 19, after "of claim" insert -- 25. --.

Signed and Sealed this

Seventeenth Day of October, 1995

*Attest:*

*Attesting Officer*

BRUCE LEHMAN

*Commissioner of Patents and Trademarks*